United States Patent [19]

Koepf

[11] 4,173,001
[45] Oct. 30, 1979

[54] LASER APPARATUS

[76] Inventor: Robert A. Frosch, Administrator of the National Aeronautics and Space Administration, with respect to an invention of Gerhard A. Koepf, Seabrook, Md.

[21] Appl. No.: 837,795

[22] Filed: Sep. 29, 1977

[51] Int. Cl.$^2$ .............................................. H01S 3/095
[52] U.S. Cl. .......................... 331/94.5 C; 331/94.5 P
[58] Field of Search .................... 331/94.5 C, 94.5 L, 331/94.5 M, 94.5 D, 94.5 P, 94.5 PE, 94.5 G

[56] References Cited

U.S. PATENT DOCUMENTS

| | | | |
|---|---|---|---|
| 3,679,995 | 7/1972 | Sorokin | 331/94.5 L |
| 3,766,489 | 10/1973 | Rosenberg et al. | 331/94.5 L |
| 4,050,034 | 9/1977 | Barry et al. | 331/94.5 G |
| 4,126,832 | 11/1978 | Schlossberg et al. | 331/94.5 C |

*Primary Examiner*—William L. Sikes
*Attorney, Agent, or Firm*—Robert D. Marchant; John R. Manning; John O. Tresansky

[57] ABSTRACT

A laser apparatus having a pump laser device for producing pump laser energy upon being excited. The pump laser device having a resonating cavity for oscillating and amplifying the pump laser energy. A source laser device is used for producing source laser energy upon being excited by the pump laser energy, the source laser device having a resonating cavity for oscillating and amplifying the source laser energy. The source laser's resonating cavity is coupled within a portion of the pump laser's resonating cavity.

30 Claims, 8 Drawing Figures

LASER APPARATUS

ORIGIN OF THE INVENTION

The invention described herein was made in the performance of work under a NASA contract and is subject to the provision of section 305 of The National Aeronautics and Space Act of 1958, Public Law 85-568 (72 Stat. 435; 42USC 2457), and may be manufactured and used by or for the Government for governmental purposes without the payment of any royalties thereon or therefor.

BACKGROUND OF THE INVENTION

This invention relates generally to laser apparatuses and more particularly to laser sources having a pump laser and source laser.

Laser apparatuses utilizing a source laser for emitting laser energy and a pump laser for exciting or pumping the source laser to produce the source energy are well known in the art. These type laser apparatuses are extremely useful where the source laser energy is in the submillimeter wavelength range. Such lasers can find use in scientific plasma diagnostics where the source laser energy is transmitted into the plasma to determine the absorption rate of the plasma. This type of diagnostics is particularly useful in determining the nuclear fusion properties of radioactive materials.

Another area of use of such devices is in atmospheric research to determine the amount of pollutants present in the atmosphere and whether any detrimental effects are occuring to the earth's ionosphere due to aerosol spray cans. A further use is sensing objects through dense fog or smoke in which the source laser energy is used similarly to radar to locate objects that are obscured by fog or smoke. Such lasers also may be useful in military applications.

The prior art source and pump laser systems utilize two separate and distinct resonating cavities; one cavity for the pump laser and another cavity for the source laser. In these prior art devices, the pump laser cavity includes an optical reflector and a partial optical reflector and transmitter axially spaced from the optical reflector. Laserable material is disposed between the two reflectors to produce pump laser energy at one frequency. Usually, the laserable material is excited by any type of excitation arrangement, such as a discharge or a flash tube. The source laser cavity includes a reflector axially spaced from the pump laser cavities partially reflective and transmissive reflector and a partially reflective and transmissive reflector axially spaced from the reflector. Laserable material is disposed between the reflector and the partially reflective and transmissive reflector which is excited by the pump laser energy to produce source laser energy at a different frequency. The reflector for the source laser cavity is made to be totally reflective of the source laser energy but will pass the pump laser energy into the source laser cavity.

In operation, the excitation arrangement excites the pump laserable material which produces pump laser energy. This pump laser energy oscillates between the two reflectors in the pump laser cavity. As the pump laser energy oscillates it passes through the laserable material thereby amplifying the pump laser energy. Once proper amplification has been reached a portion of the pump laser energy passes through the partially reflective and transmissive reflector of the pump cavity, through the reflector of the source cavity and then into the source cavity where it excites the source laserable material. Upon excitation the source laserable material produces the source laser energy which oscillates between the two reflectors of the source laser cavity. Each time the source laser energy oscillates through the source laserable material the source laser energy is amplified. Upon proper amplification a portion of the source laser energy is transmitted through the partially reflective and transmissive reflector for its intended use.

In a slightly modified prior art arrangement, the partially reflective and transmissive reflector of the pump laser cavity and the reflector of the source laser cavity are replaced with a single reflector which is partially reflective and transmissive of the pump laser energy and totally reflective of the source laser energy. However, the pump laser cavity and source laser cavity are still separate and distinct and the operation of the laser is essentially the same as previously described.

When making and operating a laser system that utilizes a pump laser to excite a source laser two criteria are used; First, the maximum possible energy from the pump laser should be coupled into the source laser cavity so that the highest amount of pump laser energy excites the source laserable material; Second, the losses of the pump laser energy inside the source laser cavity should be held to a minimum to achieve efficient use of the pump laser energy.

The above prior art devices do not entirely meet this criteria because with the two separate and distinct resonating cavities pump energy losses occur when it passes through the various reflectors and losses occur inside the source laserable cavity. Consequently, less than 50% of the pump laser energy is available for excitation of the source laserable material thereby resulting in inefficient operation.

An additional disadvantage of the two separate and distinct resonating cavities is that the intensity of the pump laser energy inside the source laser cavity is restricted by the numerous energy losses that occur when the pump laser energy passes into the source laser cavity and travels therein. Thus, the efficiency of the excitation of the source laser material is reduced.

Another disadvantage is that after the pump laser energy is coupled out of the pump cavity and into the source cavity a portion of the pump energy is reflected back into the pump cavity. Typically, less than one percent of the reflected pump laser energy is required to frequency pull the pump laser thereby creating amplitude instabilities of both the pump laser energy and the source laser energy. This also contributes to inefficient laser operation. This problem can only the eliminated by creating more pump laser energy loss between the resonating cavities by introducing energy absorbing material between the two cavities.

A further disadvantage of the two separate and distinct resonator system is the difficulty of critically aligning the two resonating cavities for proper operation. This is usually accomplished with additional optical elements placed between the two cavities thereby resulting in additional pump energy losses.

Another disadvantage is that the use of two separate and distinct resonating cavities with associated optical alignment devices results in relatively large and sensitive devices.

SUMMARY OF THE INVENTION

Briefly, these and other disadvantages are overcome by providing a laser apparatus having the source laser cavity as an integral part of the pump laser cavity and having the source laser pass substantially 100 percent of the pump energy into the souce laser cavity. The laser apparatus generally includes a pump laser device for producing pump laser energy upon being excited. The pump laser device has a resonating cavity for oscillating and amplifying the pump energy. A source laser device is used for producing source laser energy upon being excited by the pump laser energy. The source laser device has a resonating cavity for oscillating and amplifying the source laser energy. The source laser resonating cavity is coupled within a portion of the pump lasers resonating cavity.

Accordingly, one object of the invention is to provide a new and improved laser apparatus.

Another object of this invention is to provide a laser apparatus which efficiently uses a pump laser cavity and a source laser cavity.

Still another object of the present invention is to provide a laser apparatus that couples substantially 100 percent of the pump laser energy into the source laser cavity.

A further object of this invention is to provide a laser apparatus that produces stable pump and source laser energy amplitudes.

A still further object of this invention is to provide a laser apparatus that does not restrict the intensity of the pump laser energy within the source laser cavity.

Another object of this invention is to provide a novel apparatus that reduces the number of optical components between the pump and source laser devices.

Another further object of this invention is to provide a laser apparatus that needs no critical alignment between the pump and source laser cavities.

A still further object of this invention is to provide a laser apparatus that is compact, rugged and relatively less expensive.

The above and further objects and novel features of the invention will appear move fully from the following detailed description where read in conjunction with the accompanying drawings.

BRIEF DESCRIPTION OF THE DRAWINGS

In the drawings where like parts are designated by the same references.

DESCRIPTION OF THE PREFERRED EMBODIMENT

Figure 1:
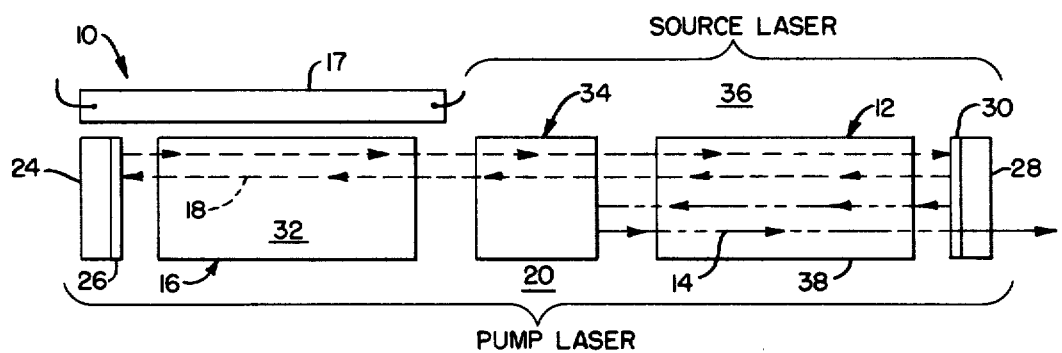
FIG. 1 is a diagrammatic view of the overall laser apparatus of the present invention.

FIG. 1 illustrates a laser apparatus, generally designated by numeral 10, which includes two laser systems; a source laser, generally designated by numeral 12, which produces and emits source laser energy 14 and a pump laser, generally designated by numeral 16, which produces pump laser energy 18 to excite source laser 12 into producing source energy 14.

Generally, pump laser 16 is excited by a conventional energy excitation source 17 for producing pump energy indicated by dash lines 18. Pump laser 16 has a resonating cavity 20 for oscillating and amplifying the pump energy. Source laser 12 is coupled within pump laser resonating cavity 20 and is excited by pump energy 18 during oscillation of the pump energy for producing source energy indicated by dash lines 14.

Pump laser 16 includes a first pump energy reflector 24 made from any material substantially 100 percent reflective of pump energy 18 such as, for example, glass coated with a material 26 highly reflective of pump energy 18. A second pump energy reflector 28 is axially spaced from first reflector 24 and is made similar thereto so that it has a material coating 30 highly reflective of pump energy 18.

Reflectors 24 and 28 form resonating cavity 20 for pump energy 18. A laserable material 32 is axially aligned between reflectors 24 and 28. Laserable material 32 may be any conventional laserable substance such as carbon dioxide which when excited will emit pump energy 18 at a specific first frequency. Energy source 17 is used to excite laserable material 32 to the state where pump energy 18 at a first frequency is produced and emitted.

Source laser 12 includes dichroic coupling element 34 axially aligned between laserable material 32 and reflector 28 within resonating cavity 20 of pump laser 16. The space between dichroic coupling element 34 and reflector 28 forms a resonating cavity 36 for source laser 12. Another laserable material 38 is axially aligned between dichroic coupling element 34 and reflector 28. Laserable material 38 is made from any laser material such as methylcyanide, which will produce source energy 14 at a different frequency than that produced by laserable material 32.

When using carbon dioxide as laserable material 32 and methylcyanide as laserable material 38, the carbon dioxide produces pump energy 18 at a first frequency having a wavelength shorter than the source energy 14 wavelength produced by the methylcyanide.

Dichroic coupling element 34 is made of a material which will transmit substantially 100 percent of pump energy 18 and simultaneously will reflect substantially 100 percent of source energy 14. Thus, pump energy 18 oscillates between reflectors 24 and 28 in resonating cavity 20 while source energy 14 oscillates between coupling element 34 and reflector 28 in resonating cavity 36.

In operation, energy source 17 imparts energy to laserable material 32 to excite it until pump energy 18 at a first frequency is emitted. Pump laser energy 18 is emitted axially and passes through dichroic coupling element 34, through laserable material 38 and is reflected in the opposite direction by reflector 28 back to reflector 24. Thus, pump energy 18 is reflected back and forth between reflectors 24 and 28 within pump cavity 20. As pump energy 18 passes through laserable material 32 during each oscillation it is amplified. Because pump cavity 20 is bounded by reflectors 24 and 28 and source cavity 36 is bounded by dichroic coupling element 34 and reflector 28, source cavity 36 is integrated within pump cavity 20 causing pump energy 18 to enter source cavity 36 during each oscillation. Because dichroic coupling element 34 passes substantially 100 percent of pump energy 18, substantially all of pump energy 18 enters source cavity 36. As pump energy 18 oscillates between reflectors 24 and 28 and passes through laserable material 38 it excites laserable material 38 until source energy 14 is produced at a frequency different from that of pump energy 18. Source energy 14 oscillates axially between dichroic coupling element 34 and reflector 28 and through laserable material 38 causing source energy 14 to be amplified. Upon proper amplification source energy 14 is coupled out through second reflector 28. With this arrangement energy losses within dichroic coupling element 34 are kept to a minimum and substantially all of pump energy 18 is used to excite laserable material 38 without having transient feedback energy disrupting pump and source energy 18 and 14, respectively.

FIGS. 2–6 illustrate various type dichroic coupling elements 34 that may be used in laser apparatus 10 when all of the laser elements are in axial alignment. It should be understood, however, that this invention is not limited to those dichroic elements 34 illustrated but that any dichroic coupling element may be used as long as it passes substantially 100 percent of pump energy 18 and reflects substantially 100 percent of source energy 14.

Figure 2:
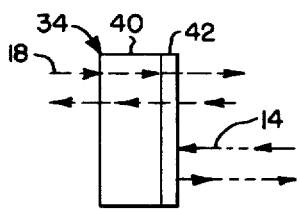
FIG. 2 is a side view of the dichroic coupling element of FIG. 1 showing the same as a transparent element having a reflective coating applied thereto.

As illustrated in FIG. 2, dichroic coupling element 34 is a sheet of transparent material 40 that substantially passes all of pump energy 18 and is coated with any well known material 42 which will pass pump energy 18 at the first frequency and reflect source energy 14 at the second frequency. Further, coating 30 on second reflector 28 (FIG. 1) in addition to being highly reflective of pump energy 18, is partially reflective and partially transmissive of source energy 14 so that a portion of source energy 14 can oscillate between coating 42 and reflector 28 and another portion of source energy 14 passes out through reflector 28.

Figure 3:
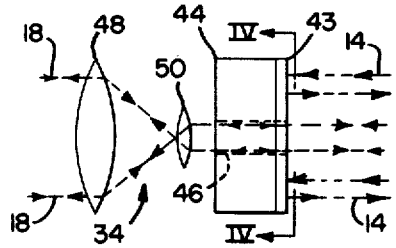
FIG. 3 is a side view of the dichroic coupling element of FIG. 1 showing the same as a reflector with a central aperture and focusing lenses.
Figure 4:
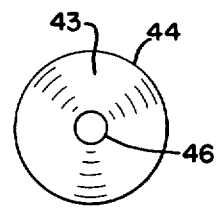
FIG. 4 is a front view of the reflector of FIG. 3 taken along the lines IV—IV.

FIGS. 3 and 4 illustrate a dichroic coupling element 34 consisting of a reflector 44 having a central aperture 46 axially aligned with reflectors 24 and 28. Preferably, reflector 44 has a coating 43 highly reflective of source energy 14 which surrounds aperture 46. When using pump laser 16 made of carbon dioxide and source laser 12 made of methylcyanide, pump energy 18 will have a diameter substantially smaller than the diameter of source energy beam 14.

In operation, pump energy 18 will pass through aperture 46 to oscillate between reflectors 24 and 28 and source energy 14 will be reflected by coating 43 of reflector 44 to oscillate between reflector 44 and reflector 28.

To reduce the amount of source energy 14 lost through aperture 46, aperture 46 should be as small as possible. Therefore, the diameter of the beam of pump energy 18 must be reduced to the same diameter as aperture 46 to insure that substantially 100 percent of pump energy 18 passes therethrough. To achieve this a pair of focusing lenses 48 and 50 are positioned between laserable material 32 and reflector 44.

When using dichroic coupling elements 34 as shown in FIGS. 2–4, the source laser energy is coupled out through reflector 28. Preferably, reflector 28 is a hybrid mirror as described in *Optical Communications* "Hybrid Output Mirror for Optically Pumped Far Infrared Lasers," Vol.13 pages 366–369 by Danielewicz, Plant, and DeTemple or in *Applied Physics Letters* "Efficient High Power Operation of the CW Far-Infrared Waveguide Laser," No. 29, pages 662–664, November 1976 by Hodges, Foote and Reel.

Figure 5:
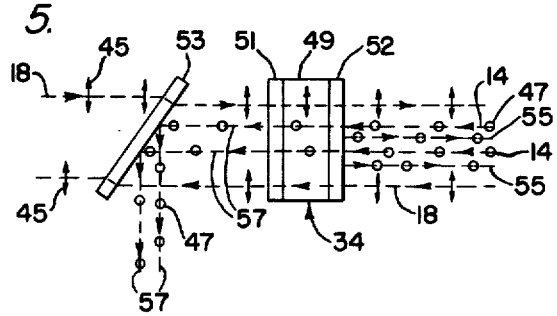
FIG. 5 is a side view of the dichroic coupling element of FIG. 1 showing the coupling element as a partial reflector of source energy and showing a Brewster plate when the pump energy is polarized perpendicular to the source energy.

As shown in FIG. 5, pump laserable material 32 produces polarized pump energy 18 which is polarized in the direction indicated by arrows 45 and laserable material 38 produces polarized source energy 14 which is polarized in the direction indicated by the circles 47. Thus, source energy 14 is polarized perpendicular to pump energy 18. When polarized energy is utilized dichroic coupling element 34 is a sheet of transparent material 49 which passes both pump energy 18 and source energy 14. Preferably, transparent material 49 is coated on one side with a material 51 which substantially passes all of pump energy 18 and source energy 14. The other side of transparent material 49 is coated with a material 52 which passes substantially all of pump energy 18 but partially reflects and partially passes source energy 14.

When using polarized energy it is preferable to couple out source energy 14 near dichroic coupling element 34 rather than through reflector 28. Therefore, reflector 28 would not be a hybrid mirror as previously described but would be a reflector of both source energy 14 and pump energy 18. In addition, to couple source energy 14 out of the system as Brewster plate 53 is used between laserable material 32 and dichroic coupling element 34. Brewster plate 53 is oriented so that substantially all of polarized pump energy 18 passes therethrough and substantially all of polarized source energy 14 is reflected at the Brewster angle out of laser apparatus 10.

In operation, polarized pump energy 18 produced by laserable material 32 passes through Brewster plate 53, dichroic coupling element 34 and is reflected by reflector 28 so that polarized pump energy 18 oscillates within pump cavity 20. Polarized pump energy 18 excites source laserable material 38 to produce polarized source energy 14 which is polarized perpendicular to polarized pump energy 18. Source energy 14 is reflected by reflector 28 back to dichroic coupling element 34 where it is partially reflected by coating 52 as energy beam 55 for oscillation within source cavity 36 and partially transmitted by coating 52 as polarized energy beam 57. Polarized energy beam 57 passes through transparency 49 and coating 51 and is reflected at the Brewster angle by Brewster plate 53 for coupling out polarized energy beam 57 from laser apparatus 10.

Although the above described arrangement is preferred when source energy 14 is polarized perpendicular to pump energy 18, other arrangements may also be used such as, for example, transparency 49 with coatings 51 and 52 may be replaced by a Brewster Mirror (not shown) coated on one surface with a material that reflects polarized pump energy at an angle and transmits the perpendicularly polarized source energy to another reflector. Thus, the polarized pump energy is oscillated at an angle between the first and second reflectors and the perpendicularly polarized source energy is oscillated between the second reflector and another reflector.

Figure 6:
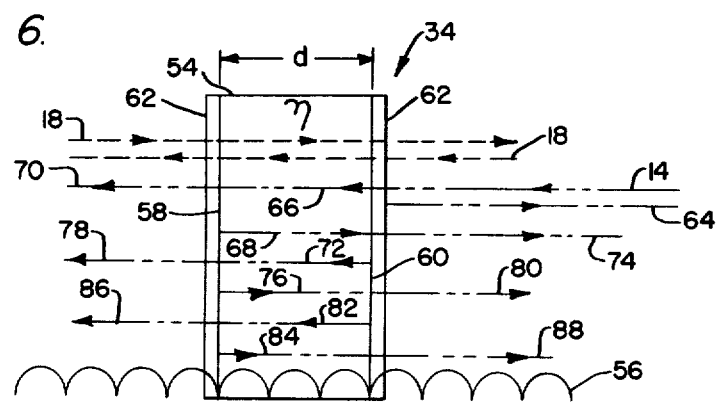
FIG. 6 is a side view of the dichroic coupling element of FIG. 1 showing the same as an etalon.

FIG. 6 illustrates dichroic coupling element 34 as a dielectric etalon device 54 that is substantially non-absorbing for pump energy 18 and source energy 14 to limit the energy loss within etalon 54 to a minimum.

Etalon 54 is made from any material which is essentially non-absorbing for the type of energy produced by pump laser 16 and source laser 12. The thickness of etalon 54 is equal to an odd number of half wavelengths 56 of source energy 14 so that $d\alpha\eta(\lambda/2)$, where $\eta$ is the index of refraction of the dielectric material etalon 54 is made of and $\lambda$ is the wavelength of source energy 14. To function efficiently etalon 54 includes a pair of substantially parallel side faces 58 and 60 having a coating 62 of material which is anti-reflective for pump energy 18, so that substantially 100 percent of pump energy 18 passes there through and is partially reflective and transmissive of source energy 14.

In operation, etalon 54 is non-absorbing and coatings 62 are anti-reflective for pump energy 18, consequently substantially 100 percent of pump energy 18 passes through etalon 54 as it oscillates. As source energy 14 strikes coating 62 a portion 64 thereof is reflected back towards reflector 28 while another portion 66 is transmitted through etalon 54. When portion 66 strikes surface 58 a portion 68 thereof is reflected back through etalon 54 and another portion 70 is transmitted out of etalon 54 toward first reflector 24. When portion 68 strikes surface 60 a portion 72 thereof is reflected back through etalon 54 and another portion 74 is transmitted through etalon 54 towards second reflector 28. This partial reflecting and partial transmission within etalon 54 continues for portion 76-88 so that portions 74, 80 and 88 are reflected towards second reflector 28 and portions 70, 78, and 86 are reflected towards first reflector 24. Since etalon 54 has parallel sides 58 and 60 and its thickness d is equal to an odd number of half wavelengths 56, portions 70,78, and 86 will all be out of phase and will cancel each other out so that no source energy 14 will be fed back into pump laserable material 32. In contrast, portions 64, 74, 80, and 88 will all be in phase and will add together so as to enhance source energy 14. Source energy 18 is coupled out of laser apparatus 10 through reflector 28. Thus, reflector 28 is preferably a hybrid mirror as previously described.

Figure 7:
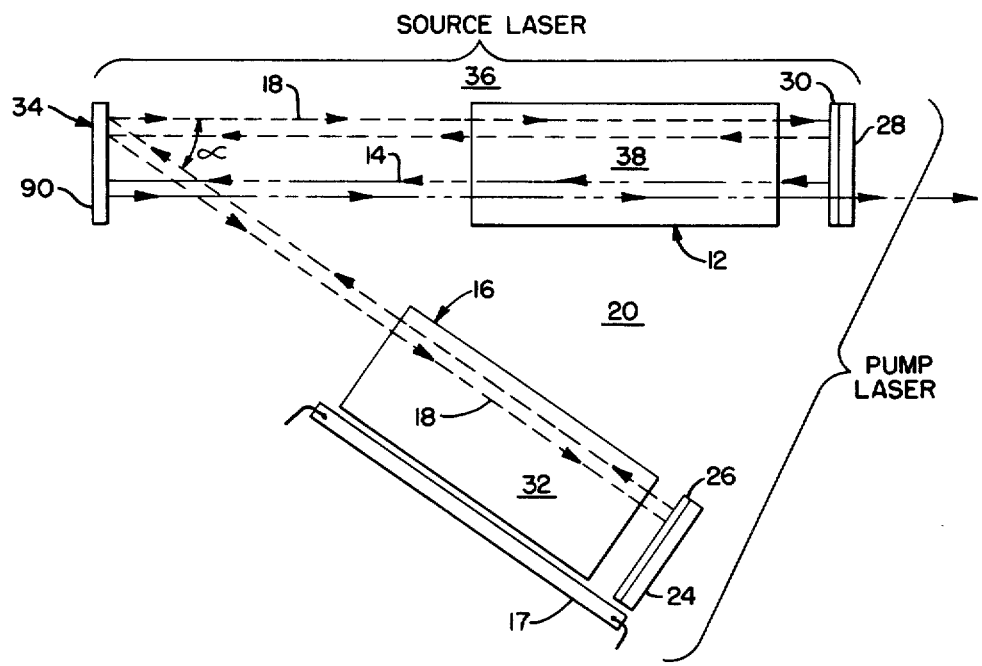
FIG. 7 is an alternative embodiment of the laser apparatus of FIG. 1 wherein the laser components are in non-axial alignment and showing the pump laser cavity formed at an acute angle and having a diffraction grating as the dichroic coupling element.
Figure 8:
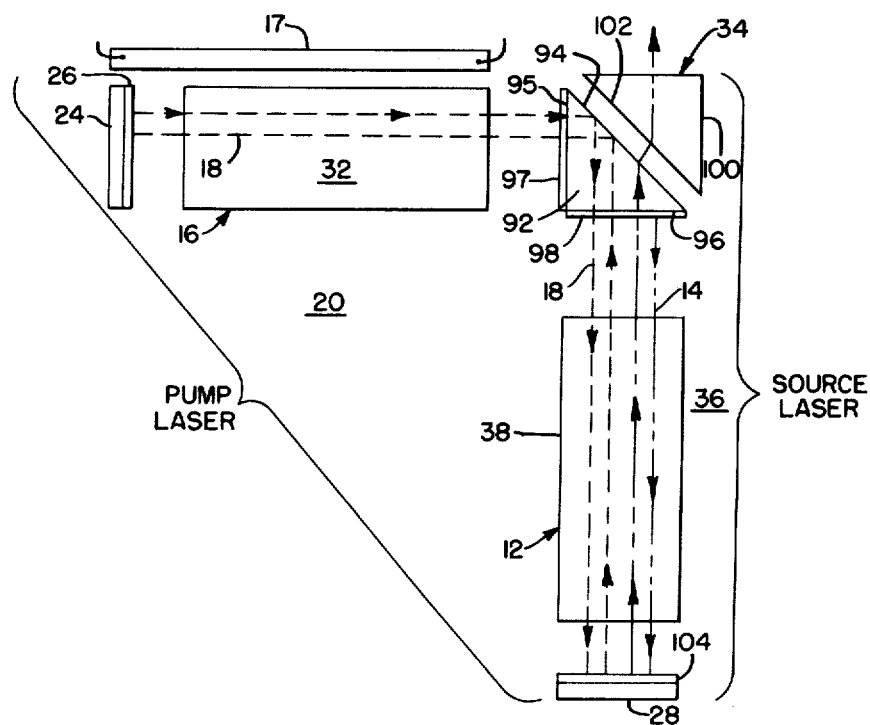
FIG. 8 is another arrangement of the alternative embodiment of FIG. 7 showing the pump laser cavity formed at a right angle and having a pair of prisms as the dichroic coupling element.

FIGS. 7 and 8 illustrate alternative embodiments to the preferred embodiment as shown in FIG. 1 wherein the various components of laser apparatus 10 are not in axial alignment. The embodiment illustrated in FIG. 7 can be used where area constraints prevent laser apparatus 10 components from being axially aligned. In this configuration, pump resonating cavity 20 is physically bent at dichroic coupling element 34 to form an acute angle $\alpha$. Dichroic coupling element 34 is a grating 90 which diffracts pump energy 18 at angle $\alpha$ so that pump energy 18 is reflected back and forth between reflectors 24 and 28. In addition, diffraction grating 90 reflects source energy 14 back to reflector 28 so that source energy 14 is reflected back and forth between diffraction grating 90 and reflector 28 before being coupled out at reflector 28.

FIG. 8 illustrates another embodiment where laser apparatus 10 is to be used in environments that prevent the laser components from being axially aligned. In this embodiment pump resonating cavity 20 is physically bent at dichroic coupling element 34 to form a typical angle of substantially 90 degrees. Dichroic coupling element 34 includes a first prism 92 having its hypotenuse or first surface 94 substantially totally internally reflective of pump energy 18 so that when pump energy 18 strikes first surface 94 it is reflected at an angle of about 90 degrees. With pump energy 18 being reflected at about 90 degrees by first surface 94 it will oscillate between reflectors 24 and 28. First prism 92 has a second surface 96 axially aligned with source laser pump material 32 and coated with a material 98 which is anti-reflective to pump energy 18 thereby passing substantially all of pump energy 18 through first prism 92. Coating material 98 is also partially reflective and partially transmissive of source energy 14 so that a portion of source energy 14 oscillates between second surface 96 and reflector 28 and when source energy 14 is amplified enough another portion of source energy 14 will be coupled out through first prism 92. First prism 92 also has a third surface 95 axially aligned with pump laser material 32 and is coated with a material 97 that is anti-reflective of pump energy 18 to allow substantially all of pump energy 18 to pass into prism 92. A second prism 100 is in alignment with first prism 92 so that first surface 94 of first prism 92 is opposite to the hypotenuse or first surface 102 of second prism 100. Source energy 14 is then coupled out of laser apparatus 10 through first surface 94 of first prism 92 and first surface 102 of second prism 100 by frustrated total reflection. Since source energy 14 is coupled out through first and second prisms 92 and 100, respectively reflector 28 is coated with a material 104 which is highly reflective of both pump energy 18 and source energy 14.

A laser mechanism has been disclosed wherein the source or emitting laser is contained within the pumping or excitation laser. Obvious modifications and variations of the disclosed embodiments of the invention are possible in the light of the above teachings, for example, such an arrangement could be used in laser systems wherein the source material has been adjusted for passive Q switching which gives high peak power and narrow source energy pulses. It is to be understood therefore that within the scope of the appended claims the invention may be practiced otherwise than as specifically described and illustrated.

Accordingly, the invention having been described in its best embodiment and mode of operation, that which is desired to be claimed by Letters Patent is:

1. A laser apparatus, comprising:
pump laser means for producing pump laser energy upon being excited, including;
first reflector means,
second reflector means spaced from said first reflector means forming a pump laser means resonating cavity therebetween, and
a laserable device between said first and second reflector means for producing said pump laser energy at a first frequency upon excitation, said pump laser energy being repeatedly oscillated between said first and second reflector means while passing through said laserable device for amplification thereof; and
source laser means for producing source laser energy upon being excited by said pump energy, including;
dichroic coupling means between said laserable device and said second reflector means forming a source laser means resonating cavity therebetween and within a portion of said pump laser means resonating cavity, and another laserable device within said source laser means resonating cavity for producing said source laser energy at a second frequency upon being excited by said oscillating pump laser energy, said source laser energy being oscillated between said dichroic coupling means and said second reflector means while passing through said another laserable device for amplification thereof 2. The laser apparatus of claim 1 wherein said first and second reflector means, said dichroic coupling means, said laserable device, and said another laserable device are axially aligned.

3. The laser apparatus of claim 2 wherein said second reflector means includes a surface coating that substantially reflects said pump laser energy at said first frequency and partially reflects and partially transmits said source laser energy at said second frequency.

4. The laser apparatus of claim 3 wherein said dichroic coupling means includes means for passing said pump laser energy at said first frequency for oscillation of said pump laser energy between said first and second reflector means.

5. The laser apparatus of claims 4 wherein said passing means of said dichroic coupling means passes substantially 100 percent of said pump laser energy for excitation of said another laserable device.

6. The laser apparatus of claim 5 wherein said dichroic coupling means includes means for reflecting said source laser energy at said second frequency for oscillation of said source laser energy between said coupling means and said second reflector means.

7. The laser apparatus of claim 6 wherein said dichroic coupling means includes a transparent element having a coating on one surface thereof which substantially totally passes said pump laser energy at said first frequency and substantially totally reflects said source laser energy at said second frequency.

8. The laser apparatus of claim 6 wherein said dichroic coupling means includes a reflective element having an aperture extending therethrough for enabling passage of said pump laser energy during oscillation between said first and second reflector means and said source laser energy being reflected between said reflective element and said second reflector means.

9. The laser apparatus of claim 8 wherein said reflective element includes means for focusing said pump laser energy through said aperture.

10. The laser apparatus of claim 6 wherein said dichroic coupling means is a dielectric means having substantially parallel surfaces in axial alignment with said first and second reflector means, said dielectric means having a thickness equal to an odd number of half wavelengths of said source laser energy for oscillating substantially all of said source laser energy between said dielectric means and said second reflector means.

11. The laser apparatus of claim 10 wherein said parallel surfaces are coated with an anti-reflective coating for passing substantially all of said pump laser energy therethrough.

12. The laser apparatus of claim 11 wherein said dielectric means includes means for non-absorbing said pump energy and said source laser energy.

13. The laser apparatus of claim 12 wherein said dielectric means is an etalon.

14. The laser apparatus of claim 2 wherein said second reflector means includes a reflective surface that substantially totally reflects said pump laser energy at said first frequency and said source laser energy at said second frequency.

15. The laser apparatus of claim 14 wherein said laserable device includes means for producing polarized pump laser energy at said first frequency upon being excited, said polarized pump laser energy passing through said dichroic coupling means for oscillation of said polarized pump laser energy between said first and second reflector means.

16. The laser apparatus of claim 15 wherein said dichroic coupling means includes means for passing substantially 100 percent of said pump laser energy for excitation of said another laserable device, said another laserable device including means for producing polarized source laser energy at said second frequency and perpendicular to said polarized pump laser energy.

17. The laser apparatus of claim 16 wherein said dichroic coupling means includes means for partially reflecting and partially transmitting said polarized source laser energy at said second frequency.

18. The laser apparatus of claim 17 further including a Brewster plate between said laserable device and said dichroic coupling means, said Brewster plate being oriented with respect to said dichroic coupling means to substantially pass all of said polarized pump laser energy and to substantially reflect said polarized source laser energy out of said laser apparatus at the Brewster angle.

19. The laser apparatus of claim 17 wherein said dichroic coupling means includes:

a transparent element substantially passing all of said polarized pump laser energy and said polarized source laser energy;

an anti-reflective coating on a surface of said transparent element, said anti-reflective coating being anti-reflective of said polarized pump laser energy and said polarized source laser energy; and another coating on another surface of said transparent element, said another coating being anti-reflective of said polarized pump laser energy and partially reflective and partially transmissive of said polarized source laser energy.

20. The laser apparatus of claim 1 wherein said first and second reflector means, said dichroic coupling means, said laserable device and said another laserable device are in non-axial alignment.

21. The laser apparatus of claim 20 wherein the axis of said laserable device and the axis of said another laserable device form an acute angle at said dichroic coupling means.

22. The laser apparatus of claim 21 wherein said dichroic coupling means includes means for diffracting said pump laser energy at said first frequency at said acute angle for oscillation of said pump laser energy between said first and second reflector means and for reflecting said source laser energy at said second frequency between said dichroic coupling means and second reflector means.

23. The laser apparatus of claim 22 wherein said dichroic coupling means is a diffraction grating.

24. The laser apparatus of claim 23 wherein said first reflector means includes a reflective surface that substantially totally reflects said pump laser energy.

25. The laser apparatus of claim 24 wherein said second reflector means includes a surface coating that substantially totally reflects said pump laser energy and partially reflects and partially transmits said source laser energy.

26. The laser apparatus of claim 20 wherein the axis of said laserable device and the axis of said another laserable device form substantially a right angle of said dichroic coupling element.

27. The laser apparatus of claim 26 wherein said dichroic coupling means includes:
   first prism means having a first surface substantially totally internally reflective of said pump laser energy at said first frequency for oscillating said pump laser energy between said first and second reflector means and having a second surface adjacent to said first surface partially reflective and partially transmissive of said source laser energy at said second frequency for oscillating a portion of said source laser energy between said second surface and said second reflector means and for transmitting a portion of said source laser energy through said second surface, and
   second prism means coupled to said first prism means so that said source laser energy passing through said second surface is coupled out of said first prism means through said second prism means.

28. The laser apparatus of claim 27 further including a third surface adjacent to said first and second surfaces and coated with a material being anti-reflective of said pump laser energy for passing substantially 100 percent of said pump laser energy through said first prism means.

29. The laser apparatus of claim 28 wherein said second surface of said first prism means is coated with an anti-reflective coating for said pump laser energy for passing substantially 100 percent of said pump laser energy through said first prism means and partially reflective and partially transmissive of said source laser energy for partially reflecting and partially passing said source laser energy.

30. The laser apparatus of claim 29 wherein said second reflector means includes a reflective surface that reflects substantially 100 percent of said pump and source laser energy.

* * * * *